United States Patent
Leyrit

(10) Patent No.: US 8,291,859 B2
(45) Date of Patent: Oct. 23, 2012

(54) ARRANGEMENT FOR POSITIONING MILKING ANIMALS IN A MILKING PARLOUR

(75) Inventor: Jean-Pierre Leyrit, Les Clays sous Bois (FR)

(73) Assignee: DeLaval Holding AB, Tumba (SE)

( * ) Notice: Subject to any disclaimer, the term of this patent is extended or adjusted under 35 U.S.C. 154(b) by 164 days.

(21) Appl. No.: 12/994,915

(22) PCT Filed: May 19, 2009

(86) PCT No.: PCT/EP2009/056088
§ 371 (c)(1),
(2), (4) Date: Nov. 29, 2010

(87) PCT Pub. No.: WO2009/150015
PCT Pub. Date: Dec. 17, 2009

(65) Prior Publication Data
US 2011/0155066 A1  Jun. 30, 2011

(30) Foreign Application Priority Data

Jun. 13, 2008 (SE) ........................ 0801387

(51) Int. Cl.
*A01J 5/00* (2006.01)
(52) U.S. Cl. .................. 119/14.03; 119/520; 119/522; 119/524
(58) Field of Classification Search ............. 119/14.03, 119/516, 520, 522, 524, 739
See application file for complete search history.

(56) References Cited

U.S. PATENT DOCUMENTS

| | | | | |
|---|---|---|---|---|
| 3,738,320 A | * | 6/1973 | Holm | 119/14.03 |
| 4,419,961 A | * | 12/1983 | Vandenberg et al. | 119/14.03 |
| 4,508,059 A | * | 4/1985 | Anderson | 119/14.03 |
| 5,184,567 A | * | 2/1993 | Peacock | 119/14.03 |
| 5,203,280 A | * | 4/1993 | Nelson | 119/14.03 |
| 5,230,299 A | * | 7/1993 | Moreau | 119/14.03 |
| 5,285,746 A | * | 2/1994 | Moreau | 119/14.03 |

(Continued)

FOREIGN PATENT DOCUMENTS

EA  009146 B1  10/2007

(Continued)

OTHER PUBLICATIONS

International Search Report, dated Oct. 12, 2009, from corresponding PCT application.

(Continued)

*Primary Examiner* — Isam Alsomiri
*Assistant Examiner* — Justin Benedik
(74) *Attorney, Agent, or Firm* — Young & Thompson

(57) ABSTRACT

An arrangement for positioning at least two milking animals in at least two milking stalls allows the animals to stand in an inclined position such that a longitudinal axis of the animals forms an angle of 10°-80° to a vertical plane (6) of a front barrier (5) of the milking stalls. The arrangement includes a power member (22) and motion transmission mechanism adapted to transfer an activating motion from the power member to individual front positioning elements (10) in the milking stalls such that the individual front positioning element in each milking stall comes in contact with a front portion of the animal and acts with a resilient force on the animal in a manner such that the animal steps backwards to a desired milking position in which the rear part of the animal is in contact with a second rear positioning element (9).

16 Claims, 2 Drawing Sheets

U.S. PATENT DOCUMENTS

| | | | |
|---|---|---|---|
| 5,638,768 A * | 6/1997 | Moreau | 119/14.03 |
| 6,216,633 B1 * | 4/2001 | Gallagher et al. | 119/14.03 |
| 6,637,375 B2 * | 10/2003 | DeWaard | 119/520 |
| 7,055,458 B2 * | 6/2006 | Guo | 119/14.04 |
| 7,584,715 B2 | 9/2009 | Teckentrup et al. | |
| 7,644,681 B2 * | 1/2010 | Moreau | 119/14.03 |
| 2001/0047765 A1 * | 12/2001 | DeWaard | 119/14.03 |
| 2008/0017118 A1 | 1/2008 | Wigholm et al. | |
| 2008/0257267 A1 | 10/2008 | Osthues et al. | |

FOREIGN PATENT DOCUMENTS

| | | |
|---|---|---|
| EA | 009156 B1 | 10/2007 |
| RU | 2 279 796 C2 | 7/2006 |

OTHER PUBLICATIONS

Supplementary International Search Report, dated Sep. 9, 2010, from corresponding PCT application.

* cited by examiner

ARRANGEMENT FOR POSITIONING MILKING ANIMALS IN A MILKING PARLOUR

BACKGROUND OF THE INVENTION AND PRIOR ART

The present invention relates to an arrangement for positioning at least two milking animals in at least two milking stalls, wherein the arrangement comprises a front barrier arranged in a vertical plane and defining a front portion of the milking stalls, positioning means adapted to position the animals in a milking position in the milking stalls such that a longitudinal axis of the animals forms an angle of 10°-80° to said vertical plane of the front barrier and wherein said positioning means comprise an individually movable front positioning element in each milking stall, adapted to define the position of a front part of the animal in the milking stall, and a second positioning element adapted to define the position of a rear portion of the milking stalls.

Milking parlors having a plurality of milking stalls are usually provided with a pit from which an operator attaches milking members to cows in the milking stalls. It is important to position the cows in the milking stalls in a manner such that it is easy for the operator to reach the udders of the cows and attach the milking members. Due to the fact that milking stalls are equally large and the cows in a herd have different sizes, there is a risk that small cows of the herd take a position in the milking stalls in which the udders of the cows are located at a relatively long distance from the pit.

U.S. Pat. No. 3,738,320 shows a herringbone milking parlour for cows including two banks of milking stalls. The milking stalls are arranged at opposite sides of a pit in a herringbone pattern. Each milking stall comprises a movably arranged feed manger. The feed mangers can be individually placed in different positions in the milking stalls depending on the sizes of the cows such that the rear parts of the cows will be placed in the vicinity of a rear guide fence in the milking stall. When the rear parts of the cows are in such positions, it is easy for an operator in the pit to reach the udders of the cows and attach the milking members.

U.S. Pat. No. 5,184,567 shows an automatic individual indexing apparatus for a dairy parlor. The dairy parlor is provided with milking stalls in which the milking animals are standing in a right angle to a front part of the milking stalls. Each milking stall comprises a pair of pivoted gates at the front part. The pivoted gates are moveable between a closed position in which they engage the shoulders of the cows and a second position releasing the cows. A closing mechanism moves the gates towards the shoulders of a cow when it has entered a milking stall. The gates hold the cow in a position such that the rear part of the cow is located in the vicinity of a butt plate which is adapted to limit rearward movement of the cow in the milking stall.

Consequently it is known to position milking animals of different sizes in milking stalls by means of feed mangers. It is also known to use a pair of gates acting on a front part of a cow in order to position cows of different sizes in a desired position in a milking stall. However, it is not possible to use such a pair of gates when the animals stand in an inclined position in relation to the front part of the milking stalls.

SUMMARY OF THE INVENTION

The object of the present invention is to provide an arrangement for positioning milking animals in milking stalls without feed mangers and where the animals stand in an inclined position in relation to a front part of the milking stalls.

This object is achieved according to the invention by the feature that the arrangement comprises a power member and motion transmission mechanism adapted to transfer an activating motion from the power member to the individual front positioning elements such that the individual front positioning elements come in contact with front portions of the animals and act with a resilient force on the animals in a manner such that they step backwards to a desired milking position in the milking stalls in which the rear parts of the animals are in contact with the second positioning element. The resilient force from the individual front positioning elements has a magnitude which results in that the cows step backwards to the second positioning element. On the other hand, the magnitude of the resilient force will not be too large such as to cause stress on the animals. Normally, a short animal has to step a larger distance back to the second positioning element than a long animal. The existence of the individual front positioning elements enable a gentle pushing of especially short animals to a desired milking position in the milking stall. In the desired milking position, the udders of the cows are easily reachable for an operator attaching milking members to the milking animals in the milking stalls.

According to an embodiment of the invention, the individual front positioning element in each milking stall is provided with a contact area adapted to come in contact with the animal. The contact area may have a shape corresponding to the area of the front part of the animal which will be in contact with the individual front positioning element. The individual front positioning element can act on an area of a front part of the animal located on the side of the longitudinal axis of the animal located nearest the front barrier. Alternatively, the individual front positioning element acts on a substantially central area of the front part of the animal.

According to a preferred embodiment of the invention, the motion transmission mechanism comprises at least one spring member which transmits the force from the power member to the resilient force by which the individual front positioning elements act on the animals. By the use of a spring member in the motion transmission mechanism, the individual front positioning elements can be given suitable resilient properties in a relatively simple manner. The motion transmission mechanism may comprise a displaceable rod element connected to the power member. The power member can displace such a rod element between an active position in which the individual front positioning elements act on the animals in the milking stalls and a non-active position in which the individual front positioning elements are in a retracted position in the milking stalls. The rod element may be arranged in parallel to said vertical plane of the front barrier. Preferably, the rod element is arranged in said vertical plane or at a relatively small distance from said vertical plane in order to reduce the length of the motion transmission mechanism.

According to a further embodiment of the invention, said spring member is a helical spring arranged around the displaceable rod element. The above mentioned positioning of the helical spring enables the arrangement to be made relatively compact. However, it is possible to use other kinds of spring members in the motion transmission mechanism. Preferably, a first end of the helical spring is connected to an element fixedly connected to the rod element and a second end of the helical spring is connected to an element movably connected to the rod element. Such a mounting of the helical spring results in that the components of the motion transmission mechanism, which are connected to the second end of the helical spring, obtain resilient properties.

According to a further embodiment of the invention, the motion transmission mechanism comprises foldable link mechanisms, each including one of said individual front positioning elements. It is possible to give the individual front positioning element a predetermined moving path towards an animal in a milking stall by means of a suitable design of the link mechanism. The foldable link mechanism may comprise a first link element connected to the individual front positioning element by a pivotable connection and a second link element connected to the individual front positioning element by a pivotable connection. In this case, the first link element can define the position of one end of the individual front positioning element and the second link element can define the position of the opposite end of the individual front positioning element.

According to a further embodiment of the invention, the front barrier comprises a frame construction. A suitably designed frame construction constitutes an effective front barrier of the milking stalls. Furthermore, the frame construction can be able to carry the power member and the motion transmission mechanism. The first link element may be connected to the frame construction via a first turnable shaft and the second link element may be connected to the frame construction via a second turnable shaft. Advantageously, the frame construction includes an upper part and a lower part wherein the vertical shafts are arranged in the space between the upper part and the lower part of the frame construction. At least one of the turnable shafts has to have an element connected to the spring member. The turnable shaft can include such an element in the form of a projecting fork-shaped portion. The helical spring can be directly connected to the fork-shaped portion or indirectly connected to it via an element such as a suitably designed casing.

According to a further embodiment of the invention, the power member is a pneumatic or a hydraulic cylinder. It is easy to initiate a motion to the motion transmission mechanism and the front positioning element by means of such a cylinder. However, it is possible to use other kinds of power member. Preferably, the second positioning element is a rump rail having a contact surface perpendicular to the longitudinal axis of the animals. Such a contact surface ensures that the rear parts of the animals are held in a relatively fixed position when the animals are in a milking position.

According to a further embodiment of the invention, the arrangement is adapted to simultaneously position milking animals in several milking stalls defined by the front barrier. Preferably, the arrangement is used in a milking parlour with groups of milking stalls arranged in a manner such that the animals are positioned in a herringbone pattern. In this case, the motion transmission mechanism can have a branched extension. Preferably, the motion transmission mechanism has a branched part for each milking stall ending in a front positioning element. Each branched part can include a spring member which gives the front positioning elements in the respective milking stalls resilient properties.

BRIEF DESCRIPTION OF THE DRAWINGS

In the following, a preferred embodiment of the invention is described by an example and with references to the attached drawings, in which.

BRIEF DESCRIPTION OF A PREFERRED
EMBODIMENT OF THE INVENTION

Figure 1:
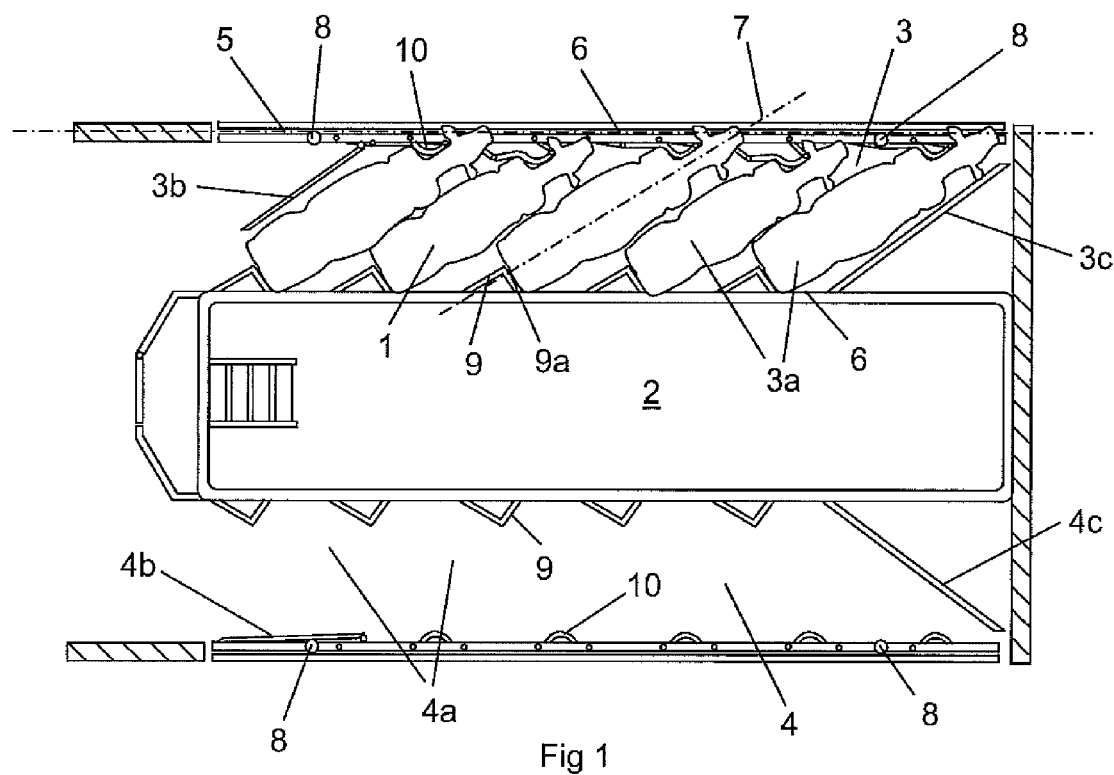
FIG. 1 shows a herringbone milking parlour for milking of cows with an arrangement according to the invention.

FIG. 1 shows a herringbone milking parlour for milking of cows 1. The parlour comprises a centrally located pit 2 in which at least one operator works. A first group of milking stalls 3 is located on one side of the pit 1 and a second group of milking stalls 4 is located on an opposite side of the pit 2. In this case, each group 3, 4 comprises five milking stalls 3a, 4a. A first entrance gate 3b to the first group of milking stalls 3 is pivotably arranged between an open position and a closed position. A fence element 3c defines an inclined side wall of the first group of milking stalls 3. When the entrance gate 3b is moved to a closed position, it defines an opposite inclined side wall of the first group of milking stalls 3. In a corresponding manner, a second entrance gate 4b to the second group of milking stalls 4 is pivotably arranged between an open position and a closed position. A fence element 4c defines an inclined side wall of the second group of milking stalls 4. When the second entrance gate 4b is moved to a closed position, it defines an opposite inclined side wall of the second group of milking stalls 4. The groups of milking stalls 3, 4 comprise front barriers 5 defining front parts of the milking stalls. The front barriers 5 are arranged in a vertical plane 6. The cows are positioned in the milking stalls such that a longitudinal axis 7 of the animals form an angle to said vertical plane 6 in the range of 10°-80°, preferably in the range of 20°-70°. Consequently, the cows 1 are positioned in a herringbone pattern in the milking stalls in the milking parlour.

The rear portion of the milking stalls 3a, 4a is defined by a rump rail 9. The rump rail 9 has a contact surface 9a which is substantially perpendicular to the longitudinal axis 7 of a cow standing in the milking position in a milking stall. In order to facilitate the attachment of the milking members of the cows 1 in the milking stalls 3a, 4a, it is desired to position all cows 1 such that a rear part of the cow 1 is in contact with the rump rail 9. With such a positioning of the cows 1, it is easy for an operator in the pit 2 to reach the udders of a cow 1 and attach a milking member. The milking parlour comprises a schematically disclosed lift mechanism 8 adapted to lift the front barrier 5 when the milking processes of the cows 1 have been finished. When the lift mechanism 8 has elevated the front barrier 5 to a suitable level, the cows are free to leave the milking stalls. Alternatively, the fence elements 3c, 4c can be formed as movable exit gates through which the cows 1 leave the milking parlour.

Each milking stall 3a, 4a comprises an individually movable front positioning element 10 in the front barrier 5 adapted to define the position of a front part of the cow 1 in the milking stall. The individual front positioning element 10 in each milking stall has a contact surface 10a adapted to come in contact with a front part of the animal. The individual front positioning element 10 is adapted to be folded out from the front barrier 5 such that it comes in contact with the front part of the cow 1 standing in the milking stall 3a, 4a. The individual front positioning element 10 comes in contact with a side part of the shoulder of the cow 1 located nearest the front barrier 5. The individual front positioning elements 10 are adapted exert a resilient force on the cows 1 in the milking stalls 3a, 4a such that the cows 1 step backwards until the rear parts of the cows 1 come in contact with the rump rail 9. The cows 1 are in a desired milking position when the rear parts of the cows 1 are in contact with the rump rail 9. The individual front positioning elements 10 are adapted to act with a gentle force on the cows 1 such that the cows 1 will not be stressed.

Figure 2:
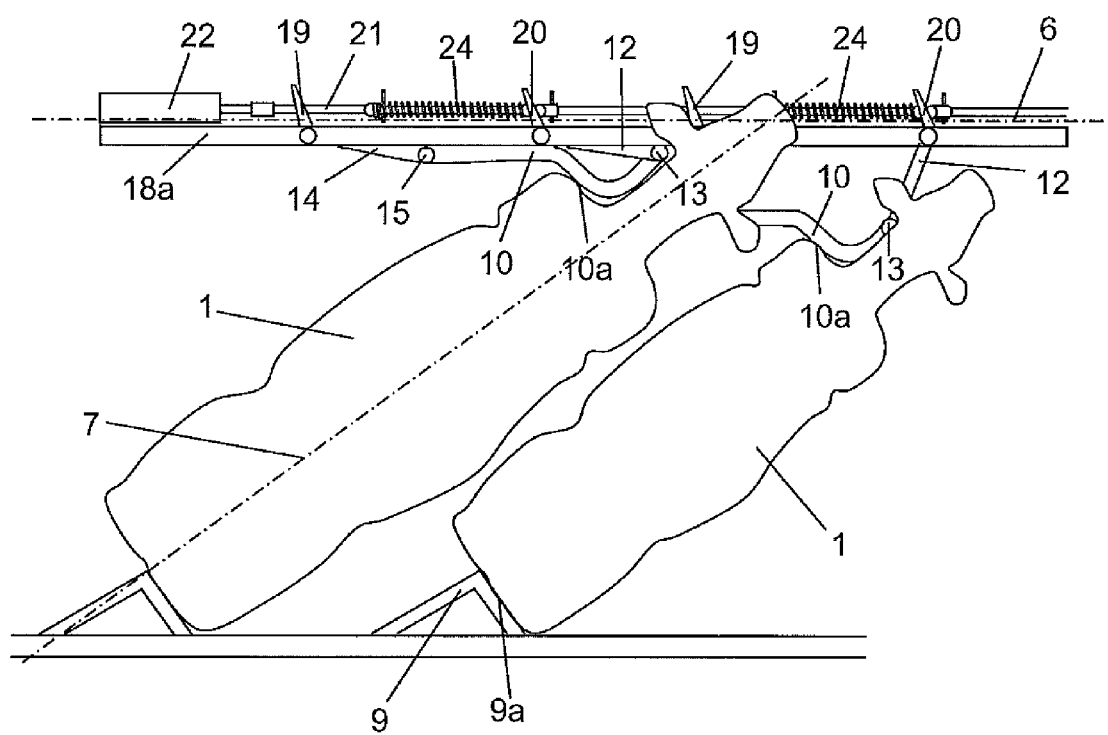
FIG. 2 shows two cows of different sizes positioned in desired milking positions.
Figure 3:
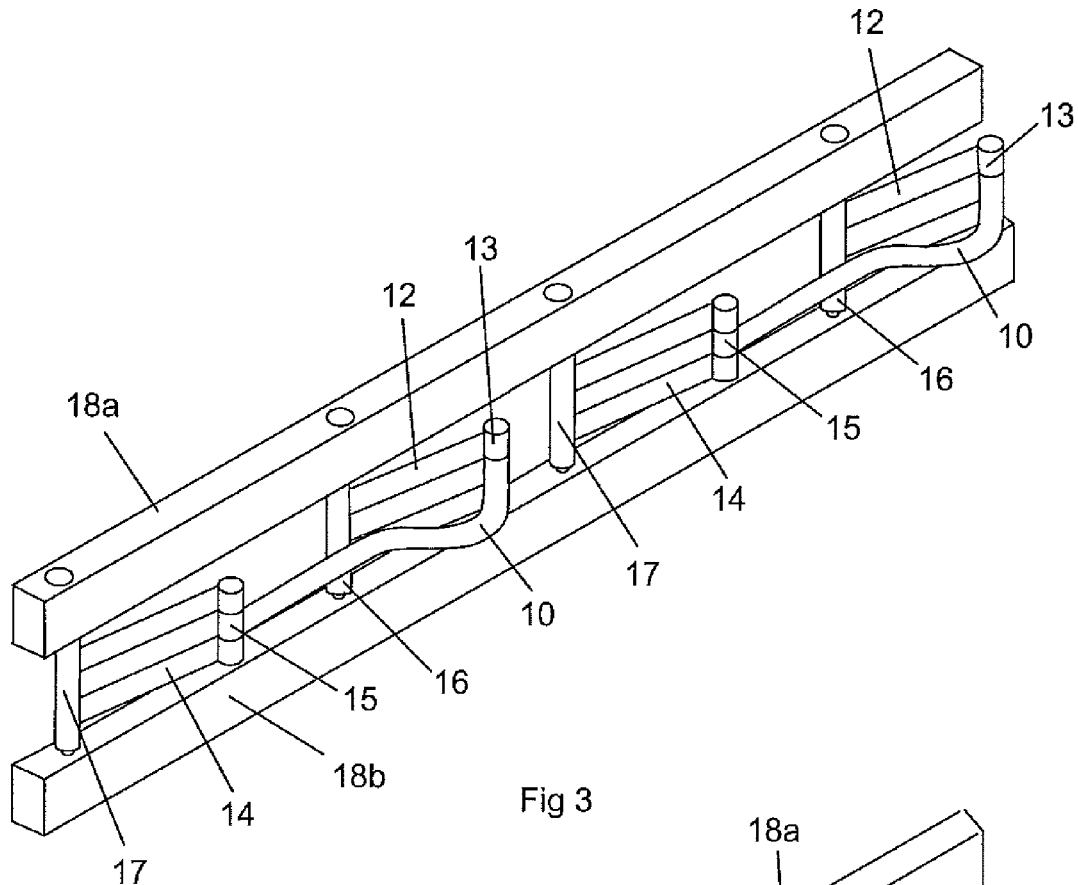
FIG. 3 shows a foldable link mechanism of a motion transmission mechanism of the arrangement and FIG. 4 shows another part of the motion transmission mechanism of the arrangement.

FIG. 2 shows two cows 1 in two adjacent milking stalls. The cow to the right is smaller and shorter than the cow to the left. The individual front positioning element 10 in each milking stall is comprised of a link mechanism. The individual front positioning element 10 is connected to a first link element 12 at one end by means of a pivotal connection 13. The individual front positioning element 10 is connected to a second link element 14 at an opposite end by means of a pivotal connection 15. FIG. 3 shows the link mechanism more in detail. Each of the first link element 12 and the second link element 14 consists of two straight bars arranged in parallel. The first link element 12 is connected to a first vertical shaft 16 at an end portion. The second link element 14 is connected to a second vertical shaft 17 at an end portion. The first vertical shaft 16 and the second vertical shaft 17 are turnably arranged in a frame construction at a distance from each other. The frame construction comprises an upper frame element 18a and a lower frame element 18b. When the vertical shafts 16, 17 are turned in one direction, the fixedly connected first link element 12 and second link element 14 perform a corresponding turning motion. The motion of the link elements 12, 14 provides a motion of the individual front positioning element 10 into the milking stall in a direction towards a cow 1 standing in the milking stall 3a, 4a.

Figure 4:
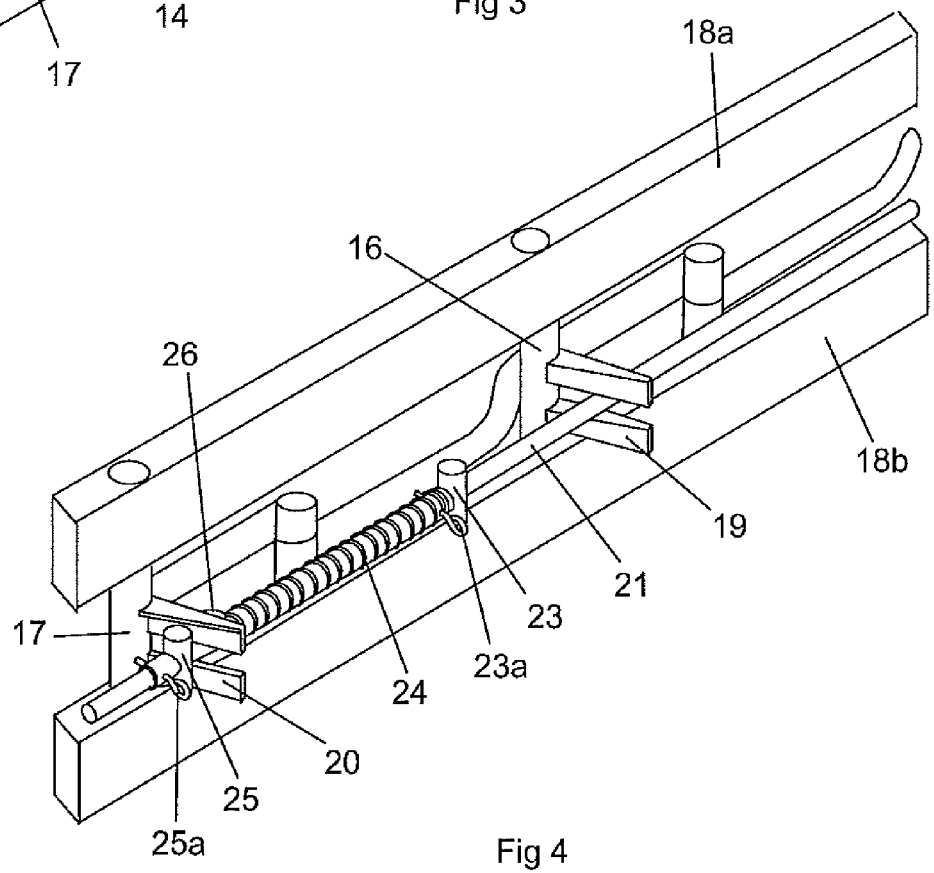

FIG. 4 shows a view of a part of the front barrier 5 from the outside of the milking stalls 3a, 4a. The first vertical shaft 16 is provided with a fixedly attached first fork-shaped portion 19 and the second vertical shaft 17 is provided with a fixedly attached second fork-shaped portion 20. A displaceable rod element 21 has an extension along substantially the whole front barrier 5. The rod element 21 is connected to a power member 22, see FIG. 2. The power member 22 can be a pneumatic cylinder or a hydraulic cylinder. The rod 21 has an extension through the fork-shaped portions 19, 20. A first locking member 23 is fixedly connected to the rod 21 by means of a locking pin 23a. A helical spring 24 is arranged around a part of the displaceable rod 21. An end of the helical spring 24 is connected to the displaceable rod 21 by means of said locking member 23. A second locking member 25 is fixedly connected to the rod 21 by means of a locking pin 25a on one side of the second fork-shaped portion 20. An end part of the helical spring 24 is connected to a casing 26 or the like adapted to transfer movement from the helical spring 24 to the second fork-shaped portion 20. The casing 26 comprises a through hole for the rod 21 such that the casing 26 is slideably arranged on the rod 21. The second locking element 25 gives the helical spring 24 a suitable pre-stressing in a mounted state.

During operation of the milking parlour, one of the entrance gates 3b, 4b is set in an open position. A row of cows 1 enters, for example, the first group of milking stalls 3. When a cow 1 reaches the inclined fence element 3c, the cow 1 is turned to a position in which the longitudinal axis 7 of the cow 1 is in parallel to the inclined fence element 3c. The following cows 1 are turned in a corresponding manner. When five cows 1 have entered the first group of milking stalls 3, the entrance gate 3c is closed. Each cow 1 is now standing in a milking stall 3a with a front part in the vicinity of the first barrier 5 and a rear part in the vicinity of a rump rail 9. In this case, the longitudinal axis 7 of the cows 1 forms an angle of about 30° to the vertical plane 6 through the front barrier 5.

The power member 22 is activated such that it provides a displacement motion of the rod element 21 to the right in FIG. 2. The rod element 21 has an extension along substantially the whole front barrier 5 of the milking stalls 3a. The motion of the rod element 21 is transferred to five locking members 23 fixedly attached to the rod element 21 in the vicinity of a front part of a milking stall. The motion of each locking member 23 is transferred to a respective helical spring 24. Each helical spring 24 acts on a casing 26 and on a fork-shaped portion 20 of a second vertical shaft 17. The helical springs 24 turn the respective second vertical shafts 17 by means of a resilient force. The turning motion of the second vertical shafts 17 is transmitted to a swinging motion of the second link elements 14. The swinging motion of the link elements 14 is transmitted to the front positioning elements 10 in the respective milking stalls 3a. The motion of the individual front positioning elements 10 results in a swinging motion of the first link elements 12 around the first vertical shafts 16.

The first link element 12 and the second link element 14 are adapted to hold the individual front positioning element 10 in a desired position when it is moved out from the front barrier 5 towards a cow 1 standing in a milking stall 3a. The contact surface 10a of the individual front positioning element 10 in each milking stall 3a comes in contact with a front part of the cow in the milking stall 3a. The individual front positioning element 10 in each milking stall 3a acts with a gentle resilient force on the cow 1 in the milking stall. The resilient force is of a magnitude which does not cause stress on the cow at the same time as it acts on the cow in a manner such that it steps backwards until the rear part of the cow 1 comes in contact with the rump rail 9. Usually, short cows 1 have to step backwards a somewhat larger distance than longer cows 1. The respective individual front positioning elements 10 in the respective milking stalls 3a push the cows 1 to a desired milking position in which the udders of the cows 1 are in a position at a relatively small distance from the pit 2 such that it is easy for an operator working in the pit 2 to attach milking members to the cows 1.

When the milking processes in the milking stalls 3a have been finished and the milking member detached from the cows 1, the power member 22 displaces the rod element 21 back to its original position. During said motion, the second locking members 25, which are fixedly connected to the rod element 21, come in contact with and acts on the fork-shaped portions 20. The fork-shaped portions 20 are turned back to their original positions against the action of the helical springs 24. The fork-shaped portions 20 turn the second shafts 17 back to their original positions and thereby the whole link mechanisms 10, 12-16 to their original positions in the front barrier 5. The individual front positioning elements 10 get out of contact with the cows 1 such that they will be freely movable in the milking stalls 3a. The lift mechanism 8 is activated and the front barrier 5 is lifted upwards to a predetermined height such that the cows can leave the milking stalls 3a. The first group of milking stalls 3 is now ready to receive new milking cows 1. The first group of milking stalls 3 and the second group of milking stalls 4 can receive cows 1 in an alternating manner.

The invention is not limited to the described embodiments but may be varied and modified freely within the scope of the claims.

The invention claimed is:

1. An arrangement for positioning at least two milking animals (1) in at least two milking stalls, the arrangement comprising:
 a front barrier (5) arranged in a vertical plane (6) and defining a front portion of the milking stalls, the front barrier comprising an upper frame element (18a) and a lower frame element (18b);

positioning means adapted to position the animals (1) in a milking position in the milking stalls such that a longitudinal axis (7) of the animals form an angle of 10°-80° to said vertical plane (6) of the front barrier (5), said positioning means comprising i) an individually movable front first positioning element (10) in each milking stall, the first positioning element (10) adapted to define the position of a front part of the animal (1) in the milking stall by resilient contact with the animal, and ii) a second positioning element (9) adapted to define the position of a rear portion of the milking stalls, the first position element contacting the animal only on a single first longitudinal side of the animal;

a power member (22); and a motion transmission mechanism adapted to transfer an activating motion from the power member (22) to the individual front positioning elements (10) such that the individual front positioning element (10) in each milking stall comes in contact with the front portion of the animal (1) and acts with a resilient force on the animal (1) in a manner such that the animal steps backwards to a desired milking position in which the rear part of the animal (1) is in contact with the second positioning element (9), the motion transmission mechanism comprising i) a spring member (24) associated with each individual first positioning element (10), each spring member transmitting the force from the power member to the resilient force by which the individual first positioning element (10) acts on the corresponding animal, ii) a displaceable rod element (21) connected to the power member (22) and located between the upper frame element (18a) and the lower frame element (18b), the rod element operatively connected to each said spring member (24);

plural foldable link mechanism (12-17), the individual first positioning elements (10) connected to a different one of the foldable link mechanisms (12-17), each foldable link mechanism comprising i) a first link element (12), connected to the individual first positioning element (10) by a pivotable connection (13), and ii) a second link element (14), connected to the individual first positioning element (10) by a pivotable connection (15), the first link element (12) connected between the upper frame element (18a) and the lower frame element (18b) via a first turnable shaft (16) and the second link element (14) connected between the upper frame element (18a) and the lower frame element (18b) via a second turnable shaft (17), the second shaft (17) operatively connected to the displaceable rod element (21).

2. An arrangement for positioning at least two milking animals (1) in at least two milking stalls, the arrangement comprising:

a front barrier (5) arranged in a vertical plane (6) and defining a front portion of the milking stalls, the front barrier comprising an upper frame element (18a) and a lower frame element (18b);

positioning means adapted to position the animals (1) in a milking position in the milking stalls such that a longitudinal axis (7) of the animals form an angle of 10°-80° to said vertical plane (6) of the front barrier (5), said positioning means comprising i) an individually movable front first positioning element (10) in each milking stall, the first positioning element (10) adapted to define the position of a front part of the animal (1) in the milking stall by resilient contact with the animal, and ii) a second positioning element (9) adapted to define the position of a rear portion of the milking stalls;

a power member (22); and a motion transmission mechanism connected to transfer an activating motion from the power member (22) to the individual front positioning elements (10) such that the individual front positioning element (10) comes in contact with the front portion of the animal (1) and acts with an individual resilient force on the animal (1) such that the animal steps backwards to a milking position in which the rear part of the animal (1) is in contact with the second positioning element, the motion transmission mechanism comprising i) a spring member (24) associated with each individual first positioning element (10), each spring member transmitting the force from the power member to the resilient force by which the individual first positioning element (10) acts on the corresponding animal, and ii) a displaceable rod element (21) connected to the power member (22) and located between the upper frame element (18a) and the lower frame element (18b), the rod element running through each said spring member (24);

plural foldable link mechanisms (12-17), the individual first positioning elements (10) connected to a different one of the foldable link mechanisms (12-17), each foldable link mechanism pivotably connected between the lower and upper frame elements, each foldable link operatively connected to the displaceable rod element (21).

3. An arrangement for positioning at least two milking animals (1) in at least two milking stalls, the arrangement comprising:

a front barrier (5) arranged in a vertical plane (6) and defining a front portion of the milking stalls;

positioning means adapted to position the animals (1) in a milking position in the milking stalls such that a longitudinal axis (7) of the animals form an angle of 10°-80° to said vertical plane (6) of the front barrier (5), said positioning means comprising i) an individually movable front first positioning element (10) in each milking stall, the first positioning element (10) adapted to define the position of a front part of the animal (1) in the milking stall by resilient contact with the animal, and ii) a second positioning element (9) adapted to define the position of a rear portion of the milking stalls, the first positioning element contacting the animal only on a single side of the animal with respect to a longitudinal axis of the animals;

a power member (22); and a motion transmission mechanism adapted to transfer an activating motion from the power member (22) to the individual front positioning elements (10) such that the individual front positioning element (10) in each milking stall comes in contact with the front portion of the animal (1) and acts with an individual resilient force on the animal (1) in a manner such that the animal steps backwards to a desired milking position in which the rear part of the animal (1) is in contact with the second positioning element (9), and wherein the motion transmission mechanism comprises a spring member (24) associated with each individual first positioning element (10), each spring member transmitting the force from the power member to the resilient force by which the individual first positioning element (10) act on the corresponding animal.

4. An arrangement according to claim 3, characterized in that the individual front positioning element (10) in each milking stall is provided with an L-shaped contact area (10*a*) adapted to come in contact with the animal, a first branch of the L-shaped contact area contacting a shoulder of the animal and a second branch of the L-shaped contact area contacting a neck of the animal.

5. An arrangement according to claim 3, wherein the motion transmission mechanism comprises a displaceable rod element (21) connected to the power member (22) and running inside each said spring member (24).

6. An arrangement according to claim 5, wherein the rod element (21) is arranged in parallel to said vertical plane (6) of the front barrier (5).

7. An arrangement according to claim 3, wherein said spring member is a helical spring (24) arranged around a displaceable rod element (21).

8. An arrangement according to claim 7, wherein a first end of the helical spring (24) is connected to an element (23) fixedly connected the rod element (21), and a second end of the helical spring (24) is connected to an element (20, 26) movably connected to the rod element (21).

9. An arrangement according to claim 8, further comprising plural foldable link mechanism (12-17), wherein the individual first positioning elements (10) are each connected to a different one of the foldable link mechanisms (12-17).

10. An arrangement according to claim 9, wherein each foldable link mechanism comprises i) a first link element (12), connected to the individual first positioning element (10) by a pivotable connection (13), and ii) a second link element (14), connected to the individual first positioning element (10) by a pivotable connection (15).

11. An arrangement according to claim 10, wherein the front barrier comprises a frame construction (18*a*, 18*b*).

12. An arrangement according to claim 11, wherein the first link element (12) is connected between the frame construction via a first turnable shaft (16) and the second link element (14) is connected between the frame construction via a second turnable shaft (17).

13. An arrangement according to claim 12, wherein at least one of the first and second turnable shafts (16, 17) comprises a connecting element (20) connected to the spring member (24).

14. An arrangement according to claim 3, wherein the power member (22) is a one of a pneumatic cylinder and a hydraulic cylinder.

15. An arrangement according to claim 3, wherein the second positioning element is a rump rail (9) having a contact surface perpendicular to the longitudinal axis of the animals (1).

16. An arrangement according to claim 3, wherein the arrangement is adapted to simultaneously position the milking animals (1) in the milking stalls defined by the front barrier (5).

* * * * *